UNITED STATES PATENT OFFICE.

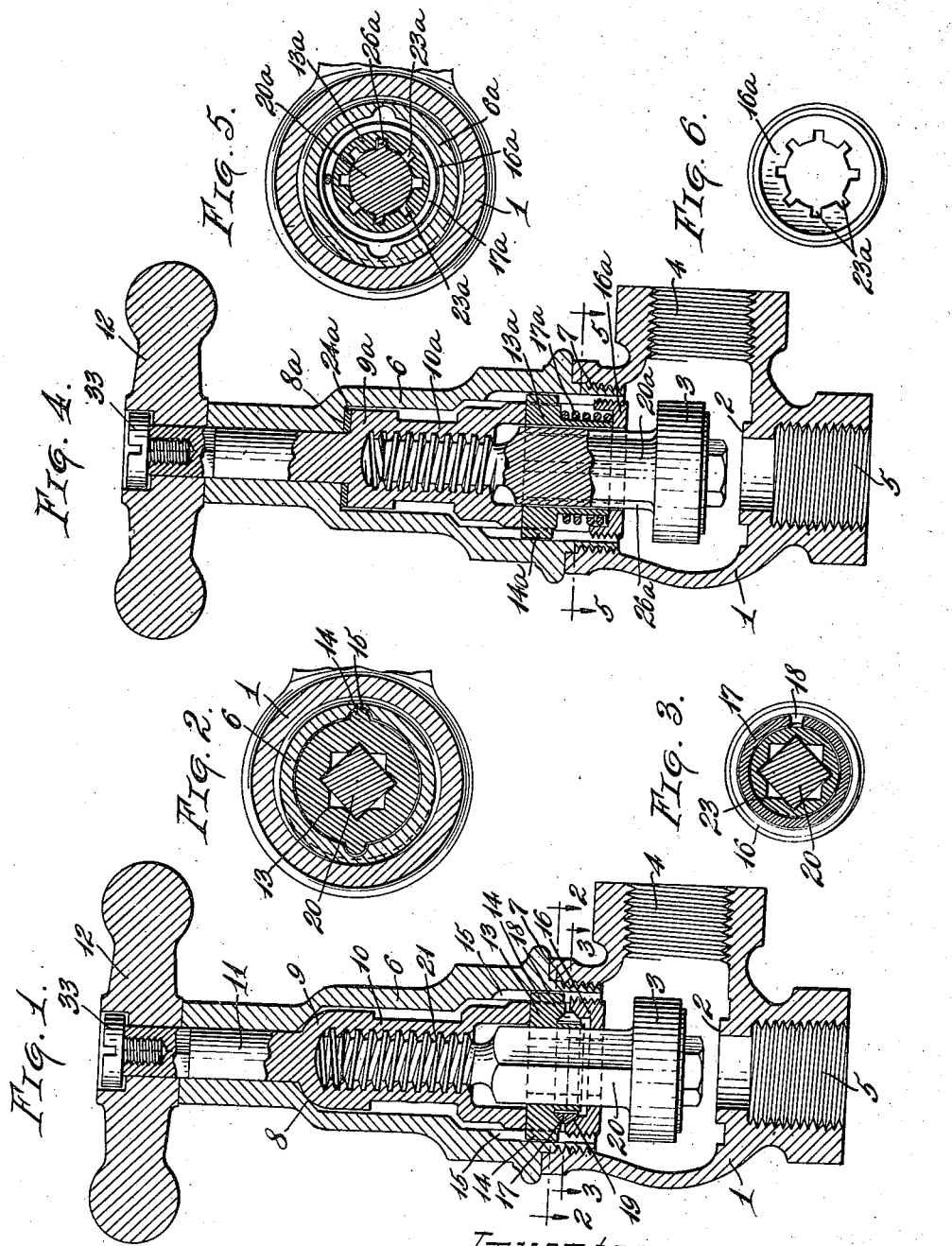

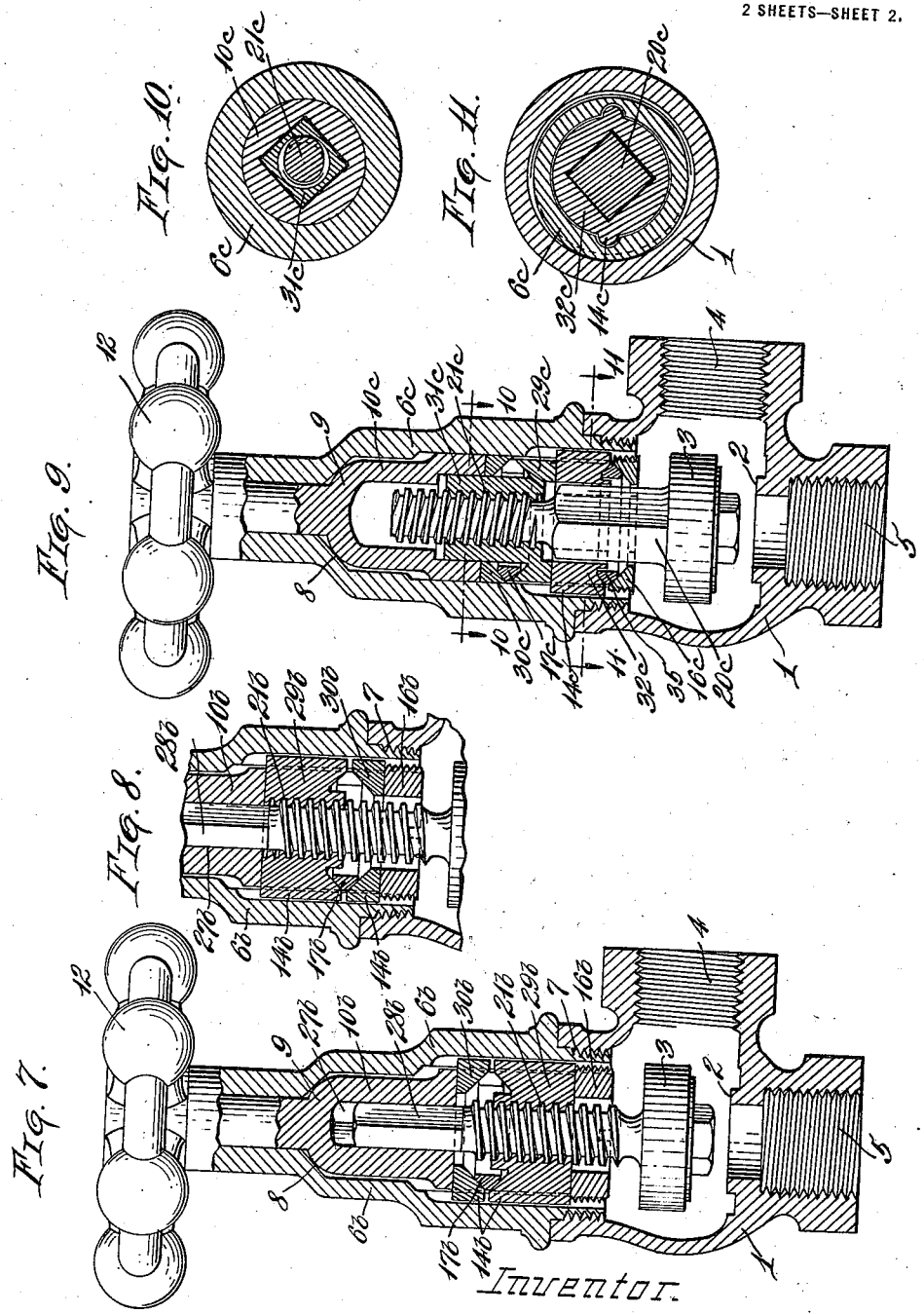

RICHARD SPRINGBORN, OF CLEVELAND, OHIO.

VALVE.

1,425,708.   Specification of Letters Patent.   Patented Aug. 15, 1922.

Application filed November 6, 1919. Serial No. 336,004.

*To all whom it may concern:*

Be it known that I, RICHARD SPRINGBORN, a citizen of the United States, residing at Cleveland, in the county of Cuyahoga and State of Ohio, have invented certain new and useful Improvements in Valves, of which the following is a specification.

This invention relates to valves, and more particularly to what are known as packless valves, to wit, valves for steam, water, air or other fluid pressure lines, and which do not require the use of packings to seal the valves against escape of fluid pressure.

The objects of the present invention are to provide an improved packless valve which is of simple construction; in which the fluid tight joint is held closed by yielding pressure; in which the member which holds the valve member to its seat when closed may have slight yielding motion to compensate for expansion and contraction of the metal as the temperature varies; in which all of the operating parts of the valve are carried by a single bonnet member capable of direct attachment to any form of valve body or bowl now in use; in which the valve parts may interlock in a manner to prevent them from getting out of adjustment in use; and in which the liability of loss of parts is largely minimized.

Further objects of the invention are in part obvious and in part will appear more in detail hereinafter.

In the drawings, Fig. 1 represents a sectional elevation of one form of valve embodying the invention; Fig. 2 is a cross section on the line 2—2, Fig. 1; Fig. 3 is a cross section on the line 3—3, Fig. 1; Fig. 4 is a view corresponding to Fig. 1 and illustrating a modified form of the invention; Fig. 5 is a cross section on the line 5—5, Fig. 4; Fig. 6 is a detail view of the adjusting nut shown in Fig. 4; Fig. 7 is a view corresponding to Fig. 1 and illustrating still another modification of the invention; Fig. 8 represents another position to which the parts of the mechanism shown in Fig. 7 may be adjusted; Fig. 9 is a sectional elevation of another form of the invention; and Figs. 10 and 11 are cross sectional views on lines 10—10 and 11—11 respectively, Fig. 9.

The valve body 1 may be of any of the usual forms, and in Fig. 1 is illustrated as of T-form, provided with a valve seat 2 with which cooperates the valve member 3 for controlling the flow from the inlet 4 to the outlet 5. 6 represents the valve bonnet, which is threaded at 7 into the valve body. This bonnet is a hollow member provided at one end with a seat 8 to receive the sealing portion 9 of the valve operating member 10, which is provided with a stem portion 11 extending to the outside of the bonnet and provided with the usual hand wheel 12. Member 10 at its lower end abuts against a pressure member 13 which exerts endwise pressure on the sealing seat and thereby prevents escape of fluid pressure from the valve. This pressure member may be of any suitable form or construction such as to accomplish the desired results. In the drawings, said member is shown as of substantially disc form, being provided with interlocking connections to the bonnet member to prevent it from rotating relative thereto. For this purpose it is provided with small ears 14 which slide longitudinally in grooves or channels 15 of the bonnet member. 16 represents an adjusting nut threaded into the end portion of the bonnet member.

Members 13 and 16 together serve as seat members to receive the compression spring which produces the endwise pressure upon member 10. This spring in Fig. 1 is shown as of the form illustrated, described and claimed in my prior patent for cushioning device, No. 1,278,246, granted September 10, 1918, to which reference may be had for a more complete description of the spring. The spring comprises an annulus 17 preferably formed of cast metal turned or otherwise shaped to proper form and split at one point in its periphery to form a gap 18. Said annulus is of peculiar form, being tapered in both directions along its axis to form upper and lower tapered or conical seats 19, which fit corresponding tapered seats on the members 13 and 16. The valve member 3 is supported by a shank 20, one portion of which is threaded as at 21, to fit corresponding threads in a cavity of member 10. These threads are preferably left-hand threads. The valve shank or stem 20 is also provided with interlocking connections to the members 13 and 16. For this purpose the valve shank is made of non-circular form, for example, square in cross section, and slides through correspondingly shaped openings in members 13 and 16. The openings in members 13 and 16 are preferably formed to permit relatively fine rotative adjustment between them. For example, the opening in one member, say member 13, may be square and the opening in the other member 16 may be somewhat star-shaped or eight pointed, forming a series of notches 23 spaced at intervals of 45° around the circumference and alternate ones of which together may be considered to be the corners of a square opening, or as shown, both openings may be eight pointed to allow drainage of water of condensation.

In assembling the valve operating mechanism in a bonnet the member 10 is first inserted and the operating handle 12 secured thereto. Member 13 is next inserted with its ears 14 in the grooves or channels 15. After inserting the split annulus 17 the nut 16 is threaded into member 10 and is screwed up until the cooperating seat portions of members 13 and 16 compress the split annulus and contract the same so as to partly or substantially close its gap 18. This adjustment is made so that one set of alternate recesses 23 of the nut come directly in line with four of the recesses of the opening in member 13. In this position of the parts, the split annulus, by its tendency to expand and its constant thrust upon the seat portions of members 13 and 16, produces endwise pressure upon member 10 and holds it tightly to its seat in the bonnet. The shank 20 of the valve stem is now inserted through the nut 16 and member 13 and with its square portion in line with the recesses in said members. By turning the valve handle the threaded connection between members 10 and 20 may be established and the valve member 3 retracted sufficiently so that the bonnet can be assembled with the valve body.

In the assembled valve the member 10 is always yieldingly held to its seat on the valve bonnet. By turning the handle 12 the valve may be moved into and out of engagement with the valve seat 2, and said valve member approaches and recedes from its seat without rotative movement. As a consequence there is no grinding of the valve upon the seat such as is likely to unduly wear the valve member.

The assembly, and particularly the interlocking of members 20, 13 and 16 prevents the parts from getting out of adjustment and also prevents loss when the valve bonnet is taken off. Member 13 is non-rotative relative to the bonnet. Valve shank 20 is non-rotative relative to member 13. Nut 16 is also non-rotative relative to the valve shank. Consequently all parts are locked together and cannot become detached except by fully unscrewing the valve stem from member 10.

Figs. 4, 5 and 6 illustrate a modified form of the invention. Member $10^a$ in this form has a flat annular seat portion $9^a$ fitting a corresponding seat $8^a$ of the bonnet. Between said seats may be inserted a soft metal packing washer $24^a$. Said member $10^a$ is held to its seat by a spiral compression spring $17^a$ which lies between the seat member $13^a$ and the nut $16^a$ surrounding a portion of member $10^a$. Member $13^a$ is provided with ears $14^a$ sliding in longitudinal grooves of the bonnet so as to prevent rotation of said member in the bonnet. The pressure of the spring is adjusted by screwing down the nut $16^a$, just as in the form first described. Interlocking connections are also provided between members $13^a$ and $16^a$ and the valve stem $20^a$, said connections being arranged as before, to permit relative rotative adjustment between members $13^a$ and $16^a$ before the valve stem is inserted. In this case the valve stem $20^a$ is cylindrical and is provided with a longitudinal rib or ribs $26^a$ which engage with a series of notches or resesses $23^a$ in members $13^a$ and $16^a$. This arrangement provides a simple adjustment and at the same time seals all of the parts together.

In the form shown in Fig. 7 the valve driving member $10^b$ has a non-circular or square central opening $27^b$ fitting a similar portion $28^b$ of the valve stem, and which stem is also threaded as at $21^b$ to a seat member $29^b$ which cooperates with a seat member $30^b$. The threads are preferably right-handed. Between said members $29^b$ and $30^b$ is located a split annular spring $17^b$, and said seat members are provided with ears $14^b$ sliding in longitudinal grooves in the bonnet $6^b$. A nut $16^b$ is threaded into the lower end of the bonnet and abuts the lower seat member, said nut being adjustable to vary the pressure of the spring $17^b$. In this arrangement the driving member $10^b$ is held to its seat in the bonnet by the compression of spring $17^b$. Nut $16^b$ is preferably adjusted to partly but not wholly close the gap in the annulus $17^b$. Consequently, if the valve member is screwed down until it touches its seat additional turning motion of the operating handle slightly elevates the seat member $29^b$ and produces additional compressing action of the annulus $17^b$. If the adjustment is made until the gap in the split annulus is practically closed, the compression spring $17^b$ acts both upwardly and downwardly, not only holding the driving member to its seat in the bonnet but also holding the valve to its seat with yielding pressure. This arrangement permits a small amount of expansion and contraction of the parts as the temperature varies and also produces yielding valve pressure so that the device is suitable for low pressure lines.

The same valve shown in Fig. 7 can be adapted for use with high pressure lines where the valve should be positively held to its seat by merely reversing the position of the seat members 29$^b$ and 30$^b$, as shown in Fig. 8. In this arrangement the spring 17$^b$ still exerts its expansive effect upwardly to hold the driving member 10$^b$ to its seat but the nut 29$^b$ abuts directly against the end of the member 10$^b$ so that there is no yielding movement of said nut upwardly as the valve is screwed to its seat.

The member 16$^b$ has a round central hole so that in this form of the invention the parts are not locked against relative rotation as in the forms before described.

Figs. 9, 10 and 11 show another embodiment of the invention in which the driving member 10$^c$ has a square central opening in driving relation with a square extension 31$^c$ of the seat member or nut 29$^c$. Said nut and its cooperating member 30$^c$ together with the split annular spring 17$^c$ therebetween consequently all rotate relative to the bonnet 6$^c$. The tension of the spring is adjusted by screwing up the nut 16$^c$ against a follower member 32$^c$ which is provided with ears 14$^c$ traveling in grooves of the bonnet to prevent its rotation. Members 16$^c$ and 32$^c$, in the assembled device, are non-rotatable relative to the shank portion 20$^c$ of the valve member, in a manner similar to the form shown in Fig. 1, and said shank is provided with left-hand threaded connection at 21$^c$ to the nut 29$^c$.

In this form of the invention the parts are locked against relative rotation and the spring 17$^c$ exerts its pressure both upwardly against the seat in the bonnet and also permits slight yielding of the parts by expansion and contraction as the temperature varies, as in the form shown in Fig. 7.

The members 16$^c$ and 32$^c$ may also have inclined seat surfaces to receive an annulus 35, which is of the same cross section as the split annulus 17$^c$, but which is a solid ring without any gap therein, and which therefore when used as shown in Fig. 9 merely fills the seating space between the two members 16$^c$ and 32$^c$. With this arrangement the annulus 17$^c$ not only holds the part 10$^c$ to its seat in the valve bonnet but also permits yielding motion of the nut 31$^c$ with expansion and contraction. By interchanging the two parts 35 and 17$^c$ so that the latter member lies between parts 16$^c$ and 32$^c$ the same effect is secured as with the arrangement shown in Fig. 8, as the ring 35, in its new position between members 30$^c$ and 31$^c$ prevents any upward movement whatever of the nut 35$^c$.

In all forms of the invention the seating relation between the bonnet and valve driving member may be of either of the forms shown in Figs. 1 and 4. Also, in all forms, either the split annular spring or a spiral compression spring may be employed. Again, either form of the interlocking connections between the valve stem and its associated parts, as shown in Figs. 2 and 5, or in other equivalents therefor, may be employed in any form of the invention.

The operating handle 12 has driving relation with the driving member 10 and also has slight longitudinal motion thereof beneath the head of the securing screw 33. Said handle preferably abuts the top of the bonnet and the head of the screw 33 is buried in a cavity of the handle. Consequently, downward pressure applied to the handle, such as by a person stepping upon the valve handle, does not tend to unseal the joint in the valve bonnet and thereby permit lost pressure.

What I claim is:

1. Valve operating mechanism, comprising a bonnet adapted for attachment to a valve body, a valve and valve stem, rotatable valve stem driving means in sealing relation with the bonnet and having a portion extending to the outside thereof, two seat members surrounding the valve stem and lying below said stem driving means, and a compression spring between and seated on said members, one of said members being arranged to yieldingly hold the driving means in sealing relation with the bonnet, and the other of said members being longitudinally adjustable in said bonnet to vary the pressure of said spring.

2. Valve operating mechanism, comprising a bonnet adapted for attachment to a valve body, a valve and valve stem, rotatable valve stem driving means in sealing relation with the bonnet and having a portion extending to the outside thereof, two seat members surrounding the valve stem, a compression spring between and seated on said members, one of said members being arranged to yieldingly hold the driving means in sealing relation with the bonnet, and interlocking connections between said valve stem and seat members whereby they are held against relative rotation when assembled.

3. Valve operating mechanism, comprising a bonnet adapted for attachment to a valve body, a valve and valve stem, rotatable valve stem driving means in sealing relation with the bonnet and having a portion extending to the outside thereof, two seat members surrounding the valve stem, a compression spring between and seated on said members, one of said members being arranged to yieldingly hold the driving means in sealing relation with the bonnet, interlocking connections between said valve stem and seat members whereby they are held against relative rotation when assembled, and interlocking connections between one of said seat members and the bonnet to prevent relative rotation therebetween.

4. Valve operating mechanism, comprising a bonnet adapted for attachment to a valve body, a valve and valve stem, valve stem driving means having a portion extending to the outside of the bonnet and having sealing relation therewith, a pair of seat members surrounding said valve stem and removable from said bonnet, and a compression spring between and seated on said members, one of said members being arranged to exert pressure on the driving member, the other of said members being longitudinally movable in the bonnet to compress said spring.

5. Valve operating mechanism, comprising a bonnet adapted for attachment to a valve body, a valve and valve stem, valve stem driving means having a portion extending to the outside of the bonnet and having sealing relation therewith, a pair of seat members surrounding said valve stem and movable from said bonnet, a compression spring between and seated on said members, one of said members being arranged to exert pressure on the driving member, and interlocking connections between said seat members, stem and bonnet for holding the same against relative rotation.

6. Valve operating mechanism, comprising a bonnet adapted for attachment to a valve body, a valve and valve stem, valve stem driving means having a portion extending to the outside of the bonnet and having sealing relation therewith, a pair of seat members surrounding said valve stem and removable from said bonnet, a compression spring between and seated on said members, one of said members being arranged to exert pressure on the driving member, and interlocking connections between said seat members, stem and bonnet for holding the same against relative rotation, one of said seat members being longitudinally movable in the bonnet to compress said spring.

7. Valve operating mechanism, comprising a bonnet adapted for attachment to a valve body, a valve and valve stem, valve stem driving means having a portion extending to the outside of the bonnet and having sealing relation therewith, a compression spring for yieldably holding said means in sealing relation with the bonnet, a spring seat member abutting said driving means and longitudinally movable but non-rotatable in the bonnet, and an adjustable spring seat member threaded into said bonnet for adjusting the pressure of said spring.

8. Valve operating mechanism, comprising a bonnet adapted for attachment to a valve body, a valve and valve stem, valve stem driving means having a portion extending to the outside of the bonnet and having sealing relation therewith, a compression spring for yieldably holding said means in sealing relation with the bonnet, a spring seat member abutting said driving means and longitudinally movable but non-rotatable in the bonnet, and an adjustable spring seat member threaded into said bonnet for adjusting the pressure of said spring, said bonnet, spring seat members and valve stem having interlocking connections to prevent relative rotation therebetween.

In testimony whereof I affix my signature.

RICHARD SPRINGBORN.